(12) United States Patent
Musman et al.

(10) Patent No.: US 12,726,436 B2
(45) Date of Patent: Sep. 1, 2026

(54) SYSTEM OF BACKBONE ROUTERS INCLUDING EDGE ROUTERS THAT PROVIDE APPLICATION BASED ROUTING GUIDANCE TO A COMPUTING DEVICE

(71) Applicant: Teridion Technologies LTD, Ra'anana (IL)

(72) Inventors: Lior Musman, Ein Sarid (IL); Oleg Rabinovich, Netanya (IL)

(73) Assignee: Teridion Technologies LTD, Ra'anana (IL)

( * ) Notice: Subject to any disclaimer, the term of this patent is extended or adjusted under 35 U.S.C. 154(b) by 71 days.

(21) Appl. No.: 18/904,233

(22) Filed: Oct. 2, 2024

(65) Prior Publication Data

US 2026/0095406 A1 Apr. 2, 2026

(51) Int. Cl.
*H04L 45/00* (2022.01)
*H04L 45/02* (2022.01)

(52) U.S. Cl.
CPC .............. *H04L 45/46* (2013.01); *H04L 45/02* (2013.01)

(58) Field of Classification Search
CPC ................................ H04L 45/46; H04L 45/02
See application file for complete search history.

(56) References Cited

U.S. PATENT DOCUMENTS 6,097,727 A 8/2000 Peters
8,289,845 B1 * 10/2012 Baldonado ............. H04L 43/16 709/239
8,724,456 B1 5/2014 Hong et al.
8,937,957 B2 1/2015 Mitra et al.
9,363,161 B2 6/2016 Aissaoui et al.
9,369,384 B2 6/2016 Hung
11,652,738 B2 5/2023 Watts et al.
11,706,146 B1 * 7/2023 Joliveau ................. H04L 45/02 370/230
2003/0046388 A1 3/2003 Milliken
2006/0195581 A1 8/2006 Vaman et al.
2006/0265516 A1 * 11/2006 Schilling ............ H04L 61/4511 709/245

(Continued)

OTHER PUBLICATIONS

Exended Europen search report dated Dec. 2025.
U.S. Appl. No. 15/964,479, filed Mar. 31. 2020, Rave et al.

*Primary Examiner* — Chris Parry
*Assistant Examiner* — Steven C Nguyen
(74) *Attorney, Agent, or Firm* — Brian R. Short

(57) ABSTRACT

Systems, methods, and apparatuses for providing connection performance to a computing device. One method includes estimating, by one or more edge routers, a connection performance from the computing device to a destination subnet group through one or more links between computing device and the one or more edge routers, determining, by the one or more edge routers, one or more connection performance scores for the destination subnet group based on the estimated connection performance from the computing device to the destination subnet group through each of the one or more links, and communicating, by the one or more edge routers, routing guidance to the computing device based on the one or more connection performance scores of each of the one or more links, wherein the routing guidance provides edge router selection information to the computing device.

19 Claims, 8 Drawing Sheets

(56) References Cited

U.S. PATENT DOCUMENTS

| | | | | |
|---|---|---|---|---|
| 2013/0301646 | A1* | 11/2013 | Bogdanski | H04L 49/358<br>370/401 |
| 2015/0172166 | A1 | 6/2015 | Aissaoui et al. | |
| 2016/0218963 | A1* | 7/2016 | Nauck | H04L 45/123 |
| 2018/0302320 | A1* | 10/2018 | Aranha | H04L 45/22 |
| 2019/0036828 | A1* | 1/2019 | Bajaj | H04L 47/2441 |
| 2019/0319868 | A1* | 10/2019 | Svennebring | H04W 24/08 |
| 2020/0112495 | A1* | 4/2020 | Attarwala | H04L 61/4511 |
| 2021/0409303 | A1* | 12/2021 | Pande | H04L 12/4633 |
| 2022/0224635 | A1* | 7/2022 | Watts | H04L 43/0829 |
| 2023/0208737 | A1* | 6/2023 | Mohanty | H04L 49/25<br>370/252 |
| 2023/0353482 | A1 | 11/2023 | Means et al. | |
| 2024/0022626 | A1* | 1/2024 | Sinha | H04W 40/28 |
| 2024/0039838 | A1* | 2/2024 | Garcarz | H04L 41/22 |

* cited by examiner

| Application name | Destination subnet group |
|---|---|
| Ringcentral | 66.81.240.0/20<br>80.81.128.0/20<br>103.44.68.0/22<br>103.129.102.0/23<br>104.245.56.0/21<br>185.23.248.0/22<br>192.209.24.0/21<br>199.68.212.0/22<br>199.255.120.0/22<br>208.87.40.0/22 |
| Microsoft 365 | 13.107.6.152/31<br>13.107.6.171<br>13.107.6.192<br>169.254.44.2<br>13.107.9.192<br>13.107.18.10/31<br>13.107.18.15<br>13.107.128.0/22<br>13.107.136.0/22<br>13.107.140.6<br>20.20.32.0/19<br>20.190.128.0/18<br>20.231.128.0/19<br>23.103.160.0/20<br>40.92.0.0/15<br>40.96.0.0/13<br>40.104.0.0/15<br>40.107.0.0/16<br>40.108.128.0/17<br>40.126.0.0/18<br>52.96.0.0/14<br>52.100.0.0/14<br>52.104.0.0/14<br>52.108.0.0/14<br>52.238.78.88<br>52.244.37.168<br>104.47.0.0/17<br>104.146.128.0/17<br>131.253.33.215<br>132.245.0.0/16<br>150.171.32.0/22<br>150.171.40.0/22<br>169.254.44.0/30 |
| Teridion website | 159.69.189.165 |
| ACME private service | 10.0.0.0/8 |

FIGURE 7

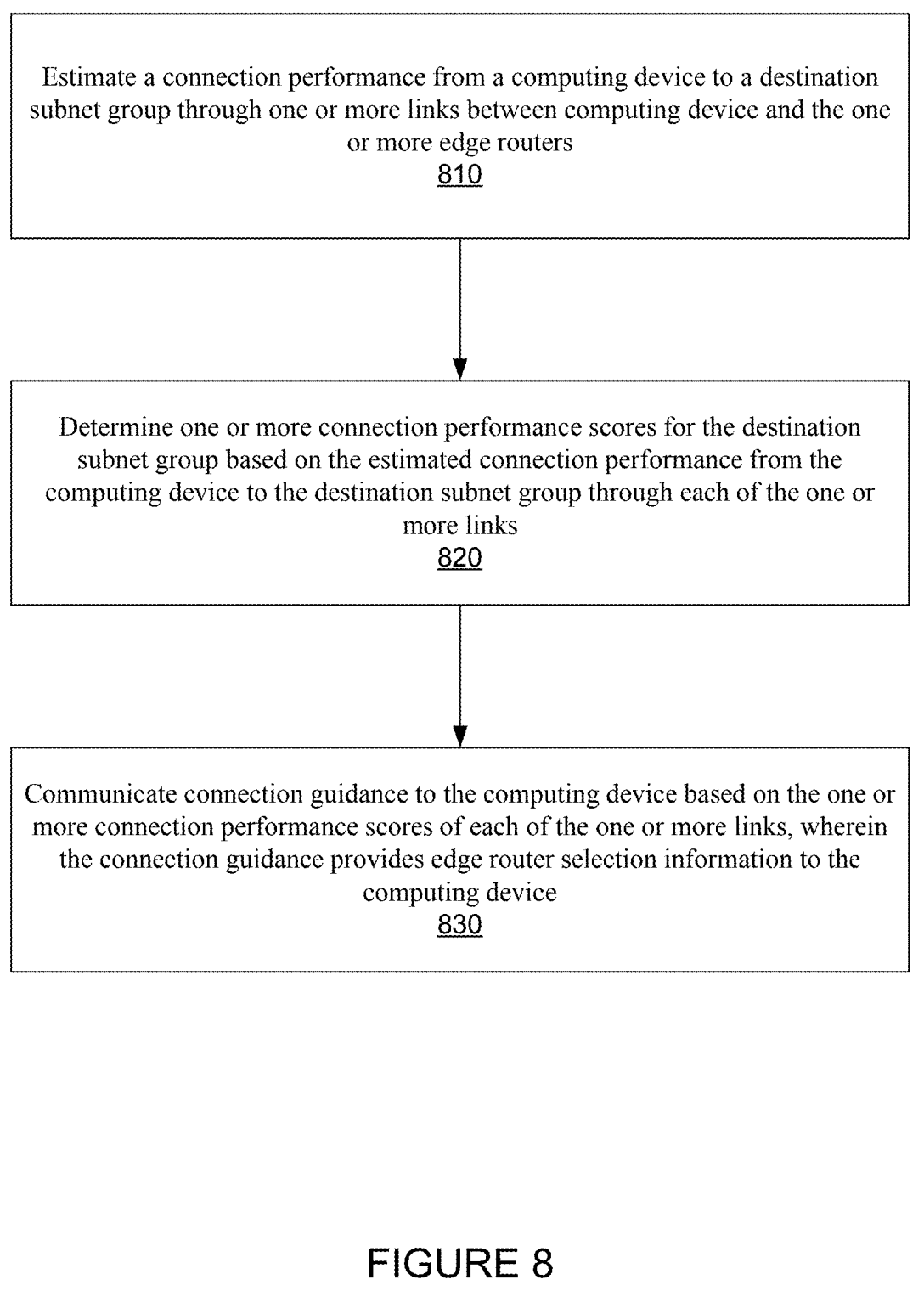

Estimate a connection performance from a computing device to a destination subnet group through one or more links between computing device and the one or more edge routers
810

Determine one or more connection performance scores for the destination subnet group based on the estimated connection performance from the computing device to the destination subnet group through each of the one or more links
820

Communicate connection guidance to the computing device based on the one or more connection performance scores of each of the one or more links, wherein the connection guidance provides edge router selection information to the computing device
830

FIGURE 8

SYSTEM OF BACKBONE ROUTERS INCLUDING EDGE ROUTERS THAT PROVIDE APPLICATION BASED ROUTING GUIDANCE TO A COMPUTING DEVICE

FIELD OF THE DESCRIBED EMBODIMENTS

The described embodiments relate generally to network communications. More particularly, the described embodiments relate to systems, methods, and apparatuses for providing edge router routing guidance to a computing device.

BACKGROUND

Companies and organizations are moving their corporate networks from private lines and MPLS (Multipath Label Switching) to Internet based solutions. Normally, that migration would involve the combination of the reliable enough ISP (internet service provider) connection (DIA or BB) (Dedicated Internet Access or Broadband) and SD-WAN (software-defined wide area network) solution of choice.

The SD-WAN market has significantly evolved over the past 10 years and recently reached the convergence point, where all SD-WAN players offer more or less the same feature set. The cornerstone of every SD-WAN solution is a CPE (customer premises equipment) running arbitrary monitoring and routing functions to enable per-application performance based reliable communication.

Sometimes organizations are not getting full value from such a solution, requiring only a limited feature set, critical to the organization. Combined with the significant costs for most SD-WAN products and the need for a special device, introducing vendor locking, organizations do not purchase SD-WAN and rely on the Internet only, which sometimes may not be good enough. SD-WAN products are expensive and require a special device located in customer premises. Organizations may not need the full set of features offered by SD-WAN providers. This leaves organizations with two bad choices: Expensive solutions that they may not fully utilize and come with hard vendor-locking, or plain internet service, which does not provide good-enough performance and stability.

It is desirable to have methods, systems, and apparatuses for providing edge router routing guidance to a computing device.

SUMMARY

An embodiment includes a system of routers including one or more edge routers connectable to a computing device, wherein the one or more edge routers are configured to estimate a connection performance from the computing device to a destination subnet group through one or more links between computing device and the one or more edge routers, determine one or more connection performance scores for the destination subnet group based on the estimated connection performance from the computing device to the destination subnet group through each of the one or more links, and communicate routing guidance to the computing device based on the one or more connection performance scores of each of the one or more links, wherein the routing guidance provides edge router selection information to the computing device.

An embodiment includes a method for providing routing guidance to a computing device. The method includes estimating, by one or more edge routers, a connection performance from the computing device to a destination subnet group through one or more links between computing device and the one or more edge routers, determining, by the one or more edge routers, one or more connection performance scores for the destination subnet group based on the estimated connection performance from the computing device to the destination subnet group through each of the one or more links, and communicating, by the one or more edge routers, routing guidance to the computing device based on the one or more connection performance scores of each of the one or more links, wherein the routing guidance provides edge router selection information to the computing device.

Other aspects and advantages of the described implementations will become apparent from the following detailed description, taken in conjunction with the accompanying drawings, illustrating by way of example the principles of the described implementations.

BRIEF DESCRIPTION OF THE DRAWINGS

FIG. 7 shows a map built by edge routers between public and private applications, and the destination subnet group, according to an embodiment.

FIG. 8 is a flow chart that includes steps of a method of providing routing guidance to a computing device that is connectable to the edge routers, according to an embodiment.

DETAILED DESCRIPTION

At least some embodiments include providing routing guidance to a computing device based on the one or more connection performance scores of each of one or more links between the computing device and edge routers. For an embodiment, the routing guidance provides edge router selection information to the computing device.

For an embodiment, the computing device is a CPE (customer premises equipment). For an embodiment, the CPE is a physical or virtual device that is located on a customer's property, customer Private Cloud, Virtual Private Cloud hosted in a public cloud provider and managed by the customer, as opposed to being housed elsewhere. The computing device may operate to consume, send, or forward data. For an embodiment, the computing device has a plurality of tunnels (VPN (virtual private network) tunnels) between it and one or more edge routers. For an embodiment, the computing device is provided with routing instructions from the one or more edge routers of the network. The routing instructions include information that allows the computing device to optimally route application flows from the computing device through available connections to the edge routers. For an embodiment, some or all the tunnels to all edge routers may be used simultaneously. For example, one application may be routed using a mobile link to one edge router and another application can be instructed to be routed using a fixed link to the same or another edge router.

Tunneling is a networking method that involves wrapping packets inside other packets, or encapsulating them, to move them from one network to another. For an embodiment, tunnels are used to encapsulate the packets of communication from the computing device to be routed through the edge routers.

For at least some of the described embodiments, the monitoring, measurement and the optimization are done in the network (at the edge routers) and not at the computing device (CPE). For an embodiment, the computing device routes the applications based on the network signaling (communication from the edge routers to the computing device).

At least some of the described embodiments include an improved or better route out of available links/tunnels between the computing device and one or more of a plurality of internet origin servers that include a destination subnet group. For an embodiment, the best, optimal, or improved route is application dependent.

Figure 1:
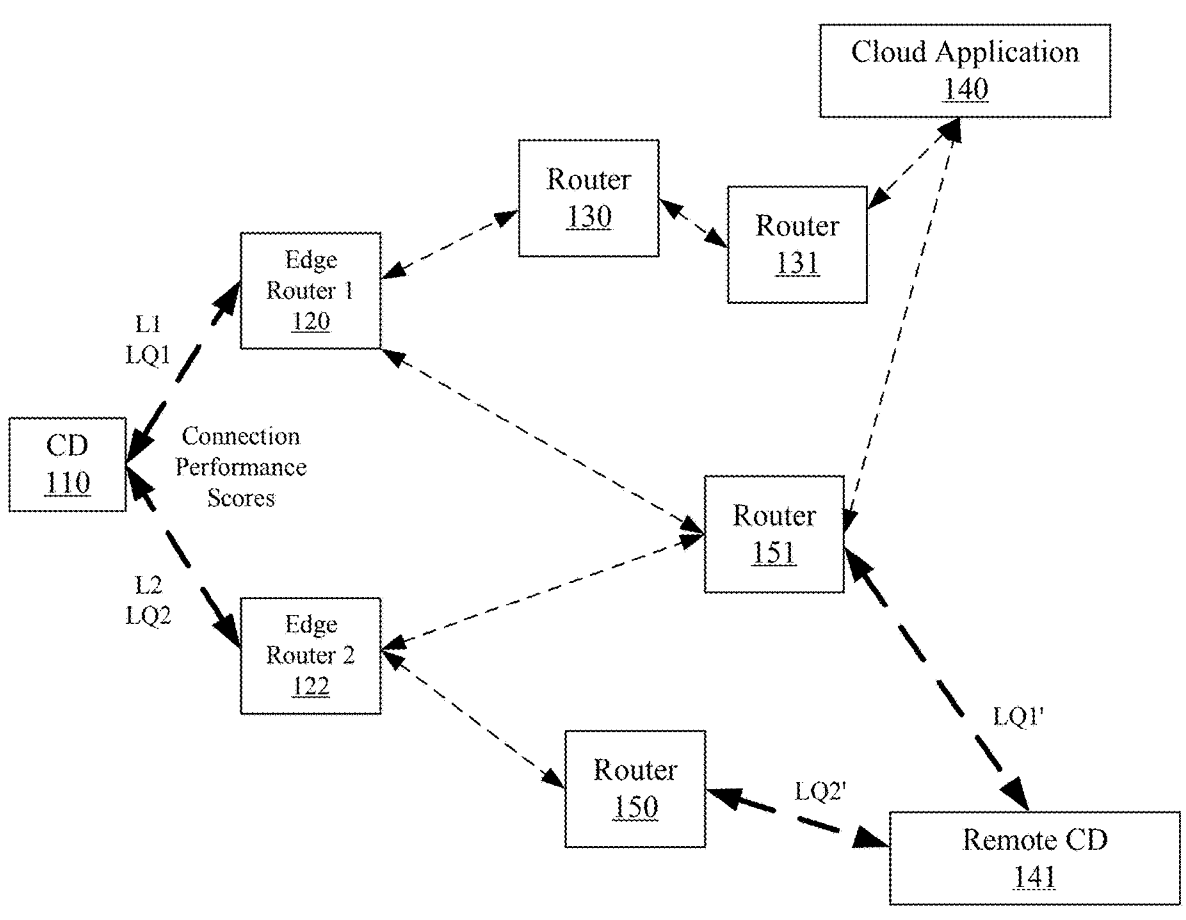
FIG. 1 shows a system of backbone routers including edge routers that provide routing guidance to a computing device that is connectable to the edge routers, according to an embodiment.

FIG. 1 shows a system of backbone routers including edge routers 120, 122 that provide routing guidance to a computing device 110 that is connectable to the edge routers 120, 122, according to an embodiment. For an embodiment, one or more edge routers 120, 122 are configured to estimate a connection performance from the computing device to a destination subnet group through one or more links (l1, l2 having link qualities lq1, lq2) between computing device 110 and the one or more edge routers 120, 122. The edge routers further estimate the connection performance based on connections (links) between the edge routers and the destination subnet group through other routers 130, 131, 150, 151 of the network.

At least some of the described embodiments include an improved or better route out of available links/tunnels between the computing device and one or more of a plurality of internet origin servers that include a destination subnet group. For an embodiment, the best, optimal, or improved route is application dependent.

For an embodiment, one or more edge routers 120, 122 are further configured to determine one or more connection performance scores for the destination subnet group based on the estimated connection performance from the computing device 110 to the destination subnet group through each of the one or more links. For an embodiment, the connection performance scores are determined based on a combination of link or connection qualities from the computing device to a destination subnet group through one or more links between computing device and the one or more edge routers.

For an embodiment, one or more edge routers 120, 122 are further configured to communicate routing guidance to the computing device based on one or more connection performance scores of each of the one or more links, wherein the routing guidance provides edge router selection information to the computing device. Accordingly, the computing device 110 is able to intelligently make a routing selection to one or more of the edge routers without having sensing or monitoring at the computing device 110 itself.

For an embodiment, the routing guidance includes a selection of one of the edge routers when more than one edge router is connectable to the computing device 110. That is, for an embodiment, the edge routers 120, 122 make the selection for the computing device 110, and then provide the selection to the computing device 110. The edge routers 120, 122 communicate between themselves and share path quality information of the links l1, l2 and the path qualities between each of the edge routers 120, 122 and the destination subnet group. Based on the shared path quality information of the links l1, l2 and the path qualities between each of the edge routers 120, 122 and the destination subnet group, the edge routers 120, 122 select which of them are to be connected to the computing device 110. The selection is then communicated to the computing device, wherein the computing device then connects to the selected one or more of the edge routers 120, 122. It is to be understood that this embodiment includes the edge routers 120, 122 communicate between them to support the selection of the tunnel. This is one option. For an embodiment, the edge routers 120, 122 can also decide selection of tunnels without communication between them. For an embodiment, even when there is a communication between the edge routers 120, 122, they still communicate "performance score" to the computing device (not a selection), so from the computing device 110 perspective, there is no difference. For an embodiment, each edge router 120, 122 performs measurements and calculates the performance scores (summary function of the measured network metrics: latency, packet loss, jitter, throughput) independently from the other edge routers directly connected to the computing device 110 and communicates it to the computing device 110. For an embodiment, the edge router may and may not include the performance information from the remote edge router into the performance scores calculation.

For an embodiment, the routing guidance includes the connection performance score for each of the one or more tunnels and wherein the computing device 110 selects one of the one or more links based on the connection performance scores. That is, for an embodiment, the edge routers 120, 122 determine one or more connection performance scores for the destination subnet group based on the estimated connection performance from the computing device 110 to the destination subnet group through each of the one or more links. Based on the connection performance scores communicated to the computing device 110, the computing device 110 is able to intelligently route to one of the edge routers 120, 122.

For an embodiment, the destination subnet group has any possible IPv4 or IPv6 address, and the network is the default gateway for the computing device, thereby eliminating a need for the end-to-end performance metrics estimation, and connection performance metrics are based only on links between the computing device and the one or more edge routers. For an embodiment, the destination subnet group is any/CIDR 0.0.0.0/0 (any possible/the range of all IPv4 and IPv6 addresses), all routable Internet addresses, all IP addresses in the world, and the network is the default gateway for the computing device IP address (0.0.0.0/0), thereby eliminating a need for the end-to-end performance metrics estimation, and connection performance metrics are based only on links between the computing device and the one or more edge routers.

Active/Standby

An embodiment includes an active/standby mode in which the edge routers 120, 122 decide which of them should be the preferred one for the computing device 110 to send its traffic through. For an embodiment, the decision is one decision for all traffic going from the computing device 110 the destination subnet group (to all other sites, and all cloud applications). For an embodiment, the decision is signaled to the computing device 110, which then routes all traffic via the preferred edge router 120, 122 and the network link to the edge router at the moment. For an embodiment, the preferred edge router is the edge routing that provides the best performance or a performance better than a desired threshold).

For an embodiment, the destination subnet group is a private application located at a remote site (the service hosted behind the remote computing device), and the communication of the routing guidance to the computing device is done using a private application subnet (RFC 1918 per app granularity vs. the entire remote site subnet).

For an embodiment, a performance metrics scoring function is different for different applications. Some applications require better network latency and others are extremely packet loss sensitive. There may be applications with similar network performance requirements. For an embodiment, the edge routers 120, 122 utilize similar performance score functions for applications that require similar network performance requirements, while using other score functions for other applications that require unsimilar network performance requirements, that is, UC/Real time applications versus heavy workloads/backups.

Performance Measurement and Signaling

For at least some embodiments, there are several possible scenarios in which the edge routers 120, 122 can signal (provide edge router selection information) the computing device 110 and impact routing of the computing device 110. For the described embodiments, the computing device 110 is connected to one or more backbone routers using one or more network links (Mobile, Fixed). For an embodiment, the edge routers 120, 122 measure performance metrics, such as latency, packet loss, throughput and others, as well as taking other considerations, such as cost, and make ongoing decisions based on sharing of the performance metrics between the edge routers 120, 122. For at least some embodiments, the performance metrics include metrics of the link(s) between the computing device 110 and the edge routers 120, 122, as well as metrics reflecting the path from each of the edge routers 120, 122 to the desired destination (remote computing device, destination subnet group). The performance metrics can be combined to estimate end-to-end path qualities of the computing device 110 to the destination subnet group (cloud applications 140, remote computing device 141).

Active/Active—Site to Cloud

As previously described, for an embodiment, the edge routers 120, 122 "decide" or provide the performance scores, which of them and which network link should be the preferred one for traffic towards each of a plurality of cloud applications. For an embodiment, the decision or the performance scores are signaled to the computing device 110 so that the computing device 110 then routes all traffic to each cloud application via the preferred edge router 120, 122 (based on the performance scores provided by the edge routers 120, 122) and the network link to the edge router 120, 122 for the application at the moment.

Active/Active—Site to Site

For at least some embodiments, the edge routers 120, 122 decide (select) the preferred edge router or provide the performance scores which of the edge routers 120, 122 should be the preferred edge router for traffic towards each of other sites (for example, remote computing devices) of the network. The performances' scores are signaled to the computing device that will route all traffic to each of the other sites via the preferred edge router 120, 122 and the network link to the edge router for the target site at the moment.

Active/Active—Site to Site, Per Application

For at least some embodiments, the edge routers 120, 122 decide (select) which of them should be the preferred one for each application in each of the other sites in the network. The decision is signaled to the computing device 110 which will route traffic to each application in other sites via the preferred edge router 120, 122 for the application of each site at the moment.

Closing the Gap Between the Complex App Identification and Limited Signaling Protocol The described embodiments allow for the computing device to receive routing instructions rather than having to determine routing instructions. Being a simple router device, the CPE (computing device) misses the complex engines capable of application identification and routing. The common denominator of such devices (CPE, computing device) is a networking routing table operating using networking prefixes as building blocks. The routing table can usually be affected both statically (manual routes configuration) and dynamically by injecting routing updates received from a peer router (BGP neighbor, which the computing device has a BGP session established with; can be any router) during BGP session or any other proprietary protocol. The embodiments here provide a computing device that is a simple routing device for which all the network driven operation is built. If the computing device was "smart" with monitoring and application capabilities, it would then be a standard SD-WAN product.

For an embodiment, the network of the edge routers 120, 122 includes a network-based SD-WAN, and is therefore required to translate any decision made on application level to the language understandable by the simple routers (BPG protocol supporting routers, which can be edge routers or any other backbone routers), i.e. network prefixes. There are several innovations made here to realize these embodiments. First, each application can be identified by the publicly known subnet groups of the servers that host the applications. The SD-WAN network automatically updates the internal lists for the applications, based on the public source. (Example: Zscaler Internet Access PoPs, where Zscaler maintains the list of the IP subnets assigned.) Example: Microsoft Office 365 application list of IP subnets published by MSFT. Second, each application can be identified by an Internet domain name. For an embodiment, the network maintains a translation between the domain name and application servers IP addresses by learning from the user sessions. Example: Dropbox, having multiple domain names associated with the application. Third, a customer may configure the network with a user-defined application and respectful network subnet groups associated with it. Example: private SAP implementation in a dedicated private IP subnet. In all these cases, for an embodiment, the edge routers 120, 122 use subnet groups language to indicate the routing decisions to the simple router device (computing device), while performing the configuration, performance measurements and reporting per application.

For an embodiment, the system of routers including the edge routers 120, 122 maintains a map between applications and the subnet groups. For at least some embodiments, generation of the map includes identifying subnet groups serving the application, identifying the Internet domain names for the application, or allowing a custom, a user-defined combination of both. For an embodiment, generation of the map includes identifying the application for the specific session flow using DPI technique. These embodiments provide a router system that translates high-level application identification methods (domain names, individual user session flow) to the destination subnet group, understandable by the simple computing devices.

Figure 2:
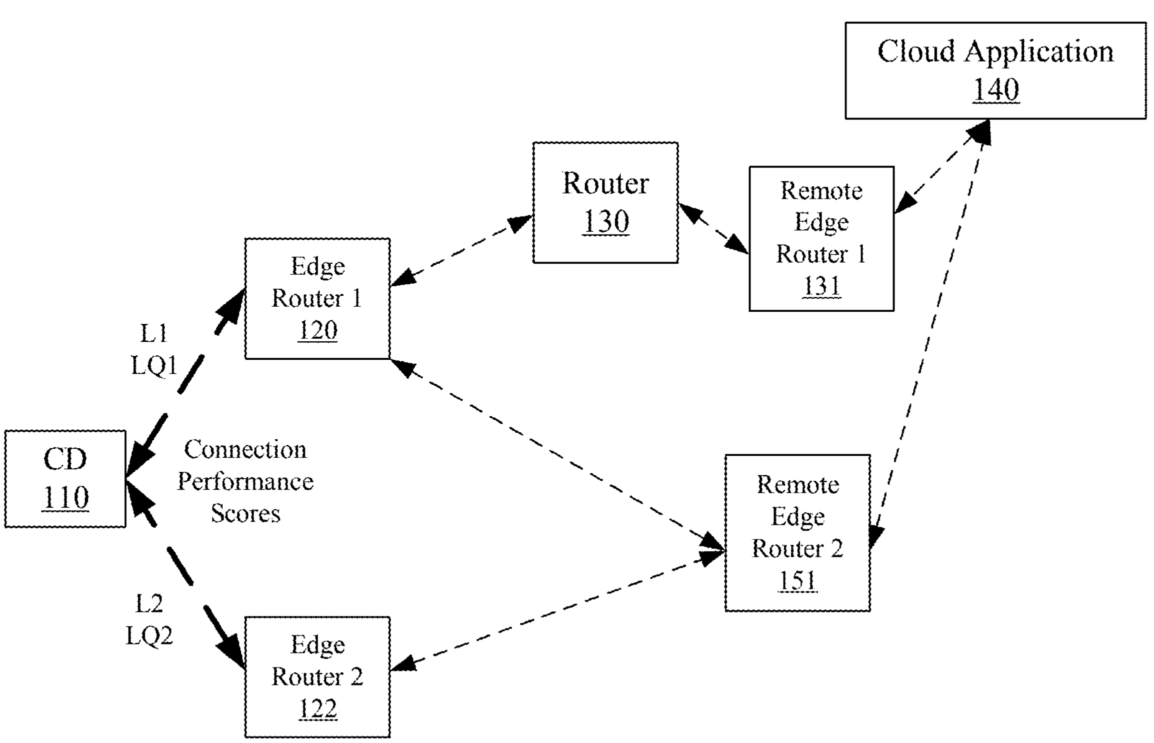
FIG. 2 shows a system of backbone routers including edge routers that provide routing guidance to a computing device that is connectable to the edge routers, according to another embodiment.

FIG. 2 shows a system of backbone routers including edge routers 120, 122 that provide routing guidance to a computing device 110 that is connectable to the edge routers 120, 122, according to another embodiment. As shown, the edge routers 120, 122 are connectable through backbone routers to the cloud application. For an embodiment, estimating the connection performance includes the one or more edge routers 120, 122 being configured to determine connection performance metrics (such as, link qualities (lq1, lq2)) between each of the one or more edge routers 120, 121 and the computing device 110.

For an embodiment, the one or more edge routers 120, 122 are further configured to determine connection performance metrics between each of the one or more edge routers and a cloud application. For an embodiment, connection performances of each of the routing paths between the one or more edge routers 120, 122 and the cloud application 140 are provided to the edge routers 120, 122. For example, a network manager may provide the connection performances of each of the routing paths between the one or more edge routers 120, 122 and the cloud application 140.

For an embodiment, the one or more edge routers 120, 122 are further configured to calculate an end-to-end performance using a summary function based on the connection performance metrics between each of the one or more edge routers and computing device, and based on the connection performance metrics between each of the one or more edge routers and the cloud application, wherein the end-to-end performance is for routing paths through the network from the computing device 110 to cloud application 140.

It is to be understood that for at least some embodiment, the end-to-end performance is determined without using or utilizing a measurement or measurement sensor at either of the computing device 110 or the cloud application 140.

For at least some embodiments, determining the connection performance metrics between each of the one or more edge routers and the cloud application is based on at least Network latency/round trip time, Network packet loss, Network jitter, and Network throughput between each of the one or more edge routers and the cloud application.

Figure 3:
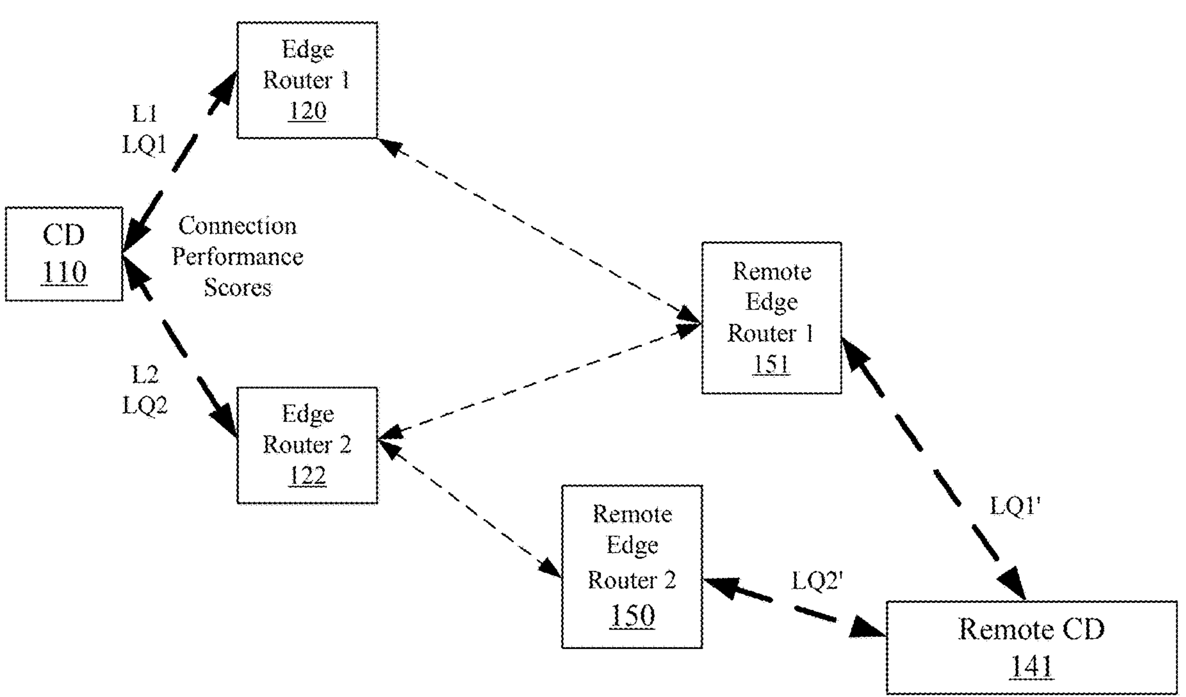
FIG. 3 shows a system of backbone routers including edge routers that provide routing guidance to a computing device that is connectable to the edge routers, according to another embodiment.

FIG. 3 shows a system of backbone routers including edge routers 120, 122 that provide routing guidance to a computing device 110 that is connectable to the edge routers 120, 122, according to another embodiment. For this embodiment, estimating the connection performance includes the one or more edge routers 120, 122 being configured to determine connection performance metrics between each of the one or more edge routers 120, 121 and the computing device 110, receive connection performance metrics between a remote edge router (150 or 151) and a remote computing device 141, determine connection performance between the one or more edge routers and the remote edge router, and calculate an end-to-end performance using a summary function based on the connection performance metrics between each of the one or more edge routers 120, 121 and computing device 110, the received connection performance metrics between the remote edge router (150 or 151) and the remote computing device 141, and the connection performance between the one or more edge routers 120, 121 and the remote edge router (150 or 151). For this embodiment, the end-to-end performance is between the computing device 110 to the remote computing device 141.

For at least some embodiments, determining the connection performance metrics between each of the one or more edge routers and the remote edge router is based on at least network latency/round trip time, network packet loss, network jitter, and network throughput between each of the one or more edge routers and the cloud application.

Figure 4:
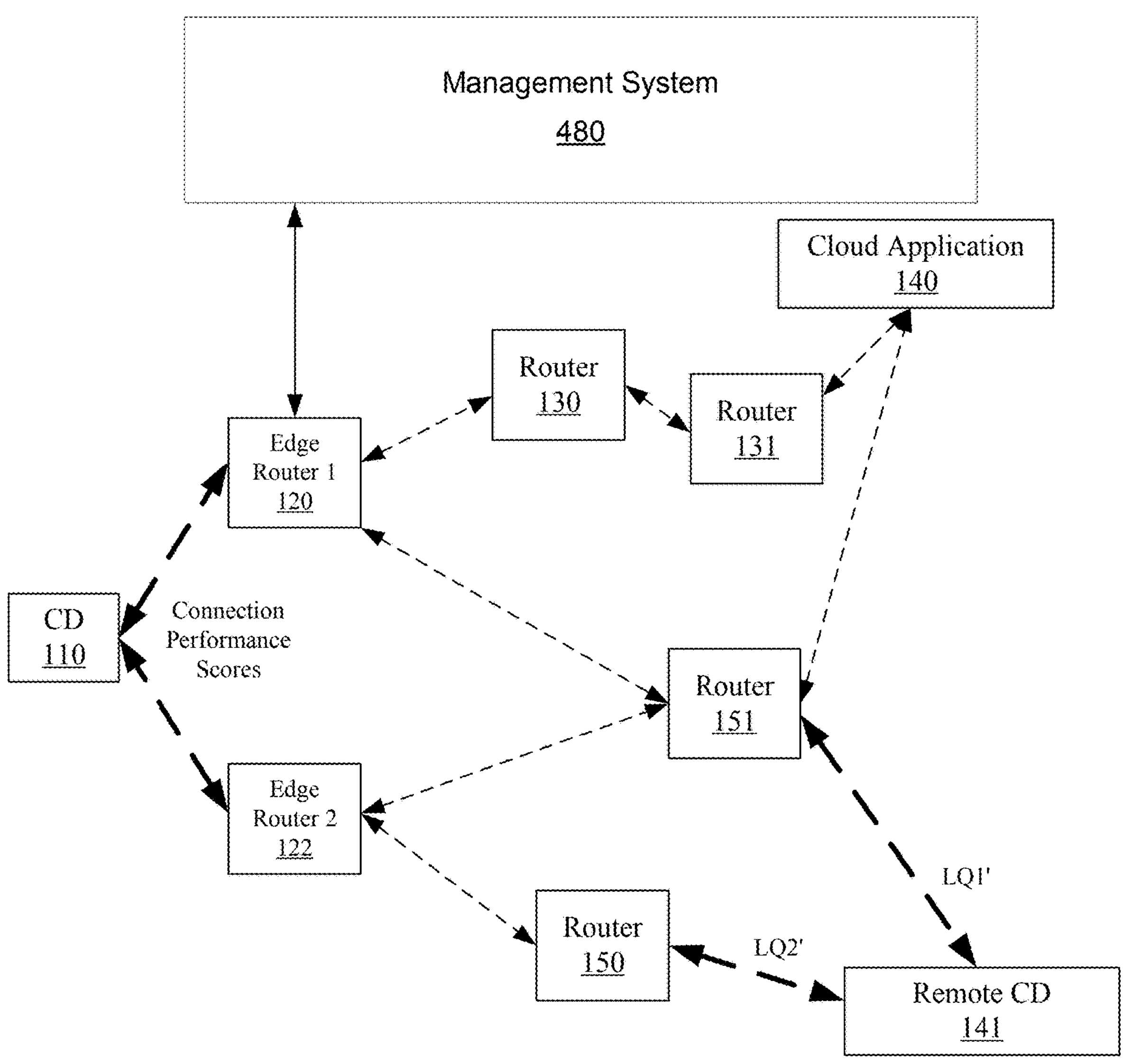
FIG. 4 shows a system of backbone routers including edge routers and a management system that provides routing guidance to a computing device that is connectable to the edge routers, according to an embodiment.

FIG. 4 shows a system of backbone routers including edge routers and a management system 480 that provides routing guidance to a computing device that is connectable to the edge routers, according to an embodiment. For at least some embodiments, the management system 480 provides basic operation for the edge routers and backbone routers, visibility and reporting on the routing decisions, and may determine routing paths of the backbone routers.

For an embodiment, properties and/or locations of the edge routers 120, 122 are monitored along with the performance parameters. When selecting the edge router(s) 120, 122 as a connecting node for the computing device, the properties and/or locations of the computing device in which traffic has been monitored can be used for estimating a projected performance of an end-to-end connection of the first device. Exemplary properties include ISP, network type (WiFi, cellular, etc.), IP type, and/or Geo location of the computing device 110.

For an embodiment, the quality of links between the computing device 110 and the edge routers 120, 122, and between the edge routers 120, 122 and other backbone routes is determined by monitoring data traffic through the links. For an embodiment, monitoring the data traffic includes passively monitoring in-band data traffic. That is, over time, network connections within the network will naturally have data traffic flow through them. The performance of the network connections can be passively monitored as this data traffic flows.

For an embodiment, monitoring the data traffic includes proactively pushing out-of-band data traffic and monitoring the out-of-band data traffic. That is, data traffic can be proactively and selectively routed through the network connections, and the performance parameters can be collected while the out-of-band data traffic is flowing through network connections. At least some embodiments include ping (for latency), running traceroute (number of hops), and/or iperf (for throughput).

For an embodiment, correlations of different types of performance parameters can be used to aid the collection of the performance parameters. That is, for example, a low-cost, easy to collect performance parameter may be used to project or estimate a high-cost, hard to collect performance parameter when the low-cost, easy to collect performance parameter is determined to be correlated to the high-cost, hard to collect performance parameter. More generally, for an embodiment, monitoring the data traffic includes monitoring a first parameter of the data traffic, and predicting a second parameter of the data traffic is predicted based on the first data parameter. For example, latency of the data traffic may be monitored because it is cheap and easy to monitor rather than throughput because throughput is harder and more expensive to monitor. This is useful when the performance of the first parameter is correlated with performance of the second parameter. Correlation can be determined by creating a machine learning (ML) algorithm to model the correlation.

Figure 5:
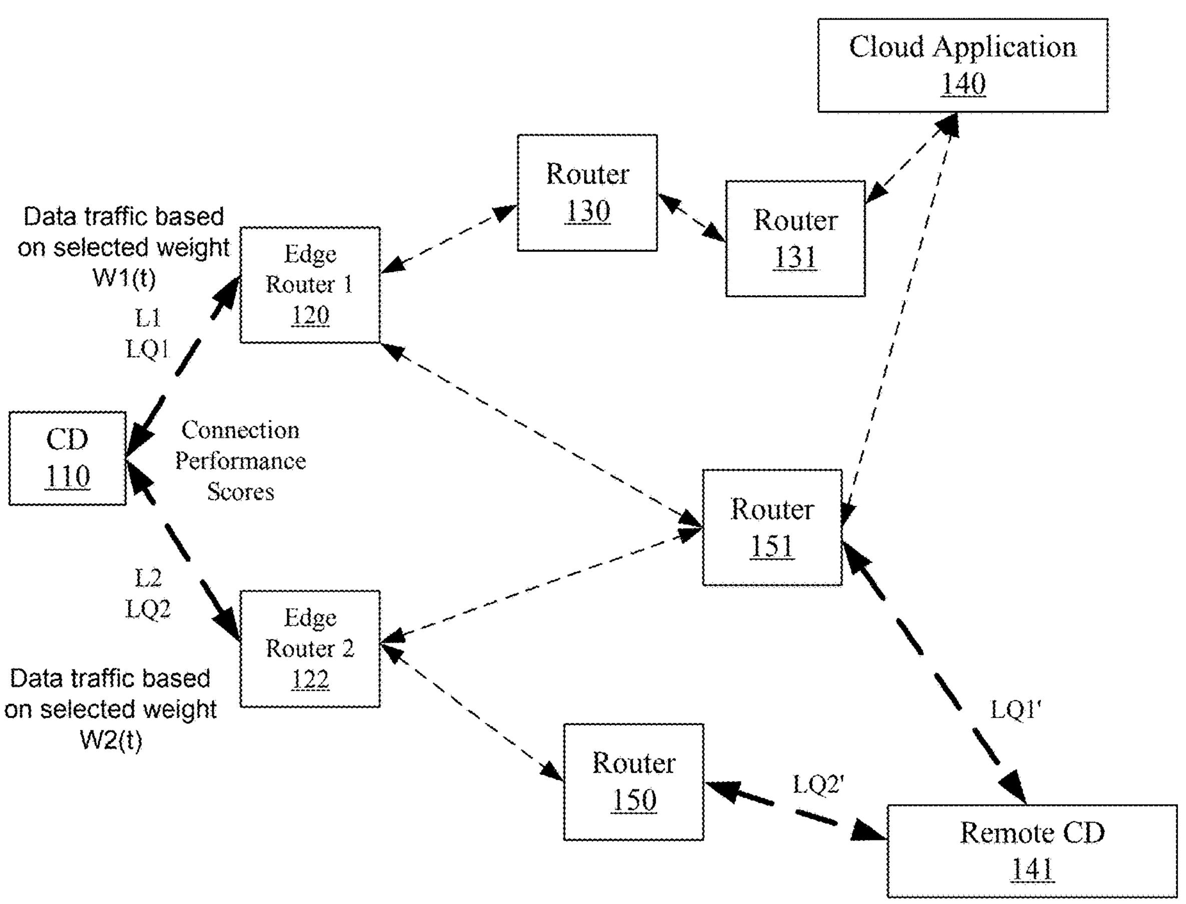
FIG. 5 shows a system of backbone routers including edge routers that provide routing guidance to a computing device, wherein the routing guidance is adaptive, according to an embodiment.

FIG. 5 shows a system of backbone routers including edge routers 120, 122 that provide routing guidance to a computing device 110, wherein the routing guidance is adaptive, according to an embodiment. For an embodiment, multiple links are established between the computing device 110 and the edge routers 120, 122. For an embodiment, multiple links (or tunnels) are established between the computing device 110 and any single one of the edge routers.

For an embodiment, the data traffic from the computing device 110 to multiple edge routers 120, 122 is weighted over time. That is, for an embodiment, different percentages of the data traffic are directed through each of the routers as directed by selected weighting W1, W2 of the data traffic. For an embodiment, the weighting W1(*t*), W2(*t*) selectively changes over time. For an embodiment, the weighting can vary from 100% to 0%. That is, the data traffic can be completely directed to one set of selected edge routers to another set of selected edge routers over time.

At least some embodiments include periodically diverting data traffic through an alternate link and monitoring the performance through the plurality of links. That is, the computing device 110 may initially connect to one or more of the edge routers. However, at a later time the computing device 110 may be instructed to divert at least some data traffic through another one or more of the edge routers to test alternate link connection qualities as they may have changed over time. At least some embodiments further include updating the routing guidance to the computing device based on the monitoring of the performance through the plurality of links.

The network of FIG. 5 includes several possible end-to-end network connections between the computing device 110 and the destination subnet group (a remote cloud application or remote computing device 141). That is, an embodiment further includes selecting a second set of edge routers to provide end-to-end network connection between the computing device 110 and the destination subnet group (a remote cloud application or remote computing device 141) based on the collected performance parameters, wherein the selected second edge routers are included within the end-to-end network connection. For an embodiment, the first set of edge routers and the second set of edge routers simultaneously provide end-to-end network connections between the computing device 110 and the destination subnet group (a remote cloud application or remote computing device 141). For an embodiment, the criteria used for selecting the first set of edge routers can also be used for selecting the second set of edge routers.

For at least some embodiments, the selection of a edge routers is based on a machine learning algorithm that predicts the end to end performance that the network can provide the computing device 110 based on collected performance parameters of the edge routers 120, 122, and/or knowledge of the network (including historical information of other networks), and or the properties of the edge routers and/or other 3*rd* party data sources.

At least some embodiments include splitting data traffic communicated between computing device 110 and the destination subnet group (a remote cloud application or remote computing device 141) between the selected first set of edge routers and the selected second edge routers. That is, the data traffic is split between the two end-to-end network connections as selected. While only two selected computing devices are shown, it is to be understood that any number of edge routers can be selected to provide simultaneous network connections to the first device 110.

At least some embodiments further include determining a set of weights based on collected or predicted performance parameters and splitting the data traffic between the selected first set of edge routers and the selected second set of edge routers based on the determined set of weights. That is, the two end-to-end connection paths can distribute the data traffic evenly (50% each) or any other possible percentage.

Figure 6:
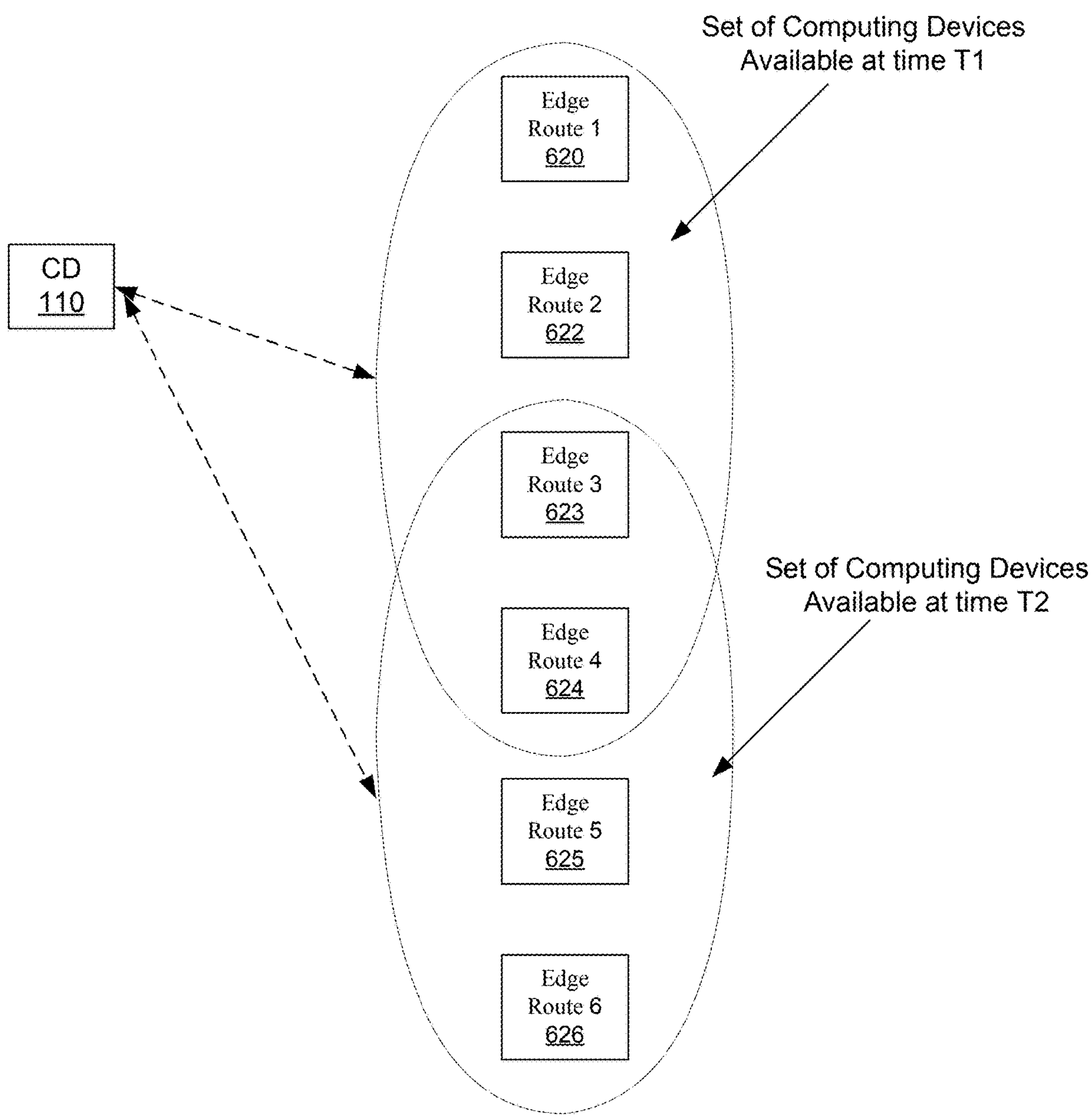
FIG. 6 shows a system of backbone routers including adaptively changing edge routers that provide routing guidance to a computing device that is connectable to the edge routers, according to an embodiment.

FIG. 6 shows a system of backbone routers including adaptively changing edge routers that provide routing guidance to a computing device that is connectable to the edge routers, according to an embodiment. As shown, at a time T1, the set of available computing devices includes edge routers 620, 622, 623, 624 and at the time T2, the set of available computing devices includes edge routers 623, 624, 625, 626.

For at least some embodiments, the set of available edge routers are selected based on the properties of the plurality of edge routers and based on past monitoring of performance parameters of the plurality of edge routers. Further, the properties can be used for selecting the set of available edge routers. Further, the location of available edge routers can be used for selecting the set of available edge routers. Exemplary performance parameters include ISP, IP subnet, IP type, Geo location, cloud provider, data center, and others.

For at least some embodiments, selecting the set of available edge routers includes identifying an initial set of potential computing devices based on monitored performance parameters, and other data (for example, 3rd party data, etc.). For at least some embodiments, the initial set of potential edge routers is selected based on a distance between the edge routers and the computing devices and/or based on past performance data from other networks. Further, present performance parameters associated with the computing device 110 and each of the edge routers of the initial set of potential edge routers are measured or predicted. For an embodiment, the set of edge routers is selected based on the measured present performance, and performance in the same network in the past (for example, if an edge router did not provide good performance (performance greater than a threshold in the last X minutes, a different edge router from the potential set is chosen)).

For at least some embodiments, the set of available edge routers changes as servers (edge routers) and/or data centers of the routers fail. That is, an edge router may be operational and included within the set of available edge routers. However, at a later time, the edge router may fail, and then be removed from the set of available edge routers.

FIG. 7 shows a map built by edge routers between public and private applications, and the destination subnet group, according to an embodiment. At least some embodiments include generating and maintaining a map between public and private applications, and destination subnet groups. For at least some embodiments, this allows the computing device to stay simple (that is, no operations on the application level of the computing device) and operate with standard BGP protocol, while the intelligence (routing selection information determination) is performed by the edge routers. Border Gateway Protocol (BGP) refers to a gateway protocol that enables the internet to exchange routing information between autonomous systems (AS). As networks interact with each other, they need a way to communicate. BGP operates only with destination subnet constructs and does not support applications. Operating on application level would require from the computing device a level of complexity which is realized instead by the edge routers having the described map. As described, for an embodiment, the edge routers maintain the map between applications and the subnet groups, thereby allowing the computing device to operate on a BGP level, as opposed to the application level.

The translation map of FIG. 7 shows exemplary application names (Ringcentral®, Microsoft 365®, Teridion® website, and ACME private service) and corresponding destination subnet group.

For an embodiment, the destination subnet group includes a private application located at a remote site or public application accessible from the internet, wherein the communication of the routing guidance to the computing device is done using a subnet group comprising private and public subnets. For an embodiment, a communication message includes one or more private or public subnets and is sent as BGP update (provided by the edge router) to the computing device. Such messages are sent periodically or based on some logic (triggered by a network event, such as, a performance condition change for a mobile link) for all destination subnets from the map. The private application subnet is a subnet from the standard private subnet ranges, according to RFC 1918, the application operator has decided to host the application on. It is accessible only from the organization VPN, since it's not routable on the Internet.

For an embodiment, the communicating of the routing guidance to the computing devices includes the one or more edge routers being further configured to build and maintain a map between public and private applications, and the destination subnet group, and transmit the routing guidance to the computing device based on the built and maintained map. For an embodiment, each edge router either periodically or by a network event trigger, iterates over all applications in the map and for each application, builds a BGP update message with a list of application subnets and the estimated application performance score, and sends the BGP update message to the computing device.

For an embodiment, building and maintaining the map between public and private applications, and the destination subnet group includes the one or more edge routers being further configured to retrieve a group of IP subnets for a public application from public sources published by an application operator, and update the map with the group of IP subnets. The management system (such as, management system 480) periodically retrieves the list of the IP subnets from the public source for each maintained application. Then, the management system distributes the IP subnet list to all edge routers in the network to enable the map maintenance and usage. For an embodiment, building and maintaining the map between public and private applications, and the destination subnet group includes the one or more edge routers being further configured to retrieve a group of IP subnets for a public application from public sources published by an application operator and update the map with the group of IP subnets. The edge routers periodically retrieve the list of the IP subnets from the public source for each maintained application. For example, Ringcentral® application IP subnets are published at https://support.ringcentral.com/article-v2/Network-requirements.html?brand=RingCentral&product=RingEX&language=en_US.

For an embodiment, building and maintaining the map between public and private applications, and the destination subnet group comprises the one or more edge router being further configured to retrieve a group of internet domain names for a public application from public sources published by an application operator, resolve to a group of IP subnets using Domain Name System (DNS), and update the map with the group of IP subnets. DNS associates domain names, like www.amazon.com, with IP addresses, like 192.0.2.44. For an embodiment, this allows users to type domain names into their browsers instead of having to remember and enter IP addresses. For an embodiment, the management system periodically retrieves the list of the domain names for each maintained application. For an embodiment, building and maintaining the map between public and private applications, and the destination subnet group comprises the one or more edge router being further configured to retrieve a group of internet domain names for a public application from public sources published by an application operator, resolve to a group of IP subnets using Domain Name System (DNS), and update the map with the group of IP subnets. DNS associates domain names, like www.amazon.com, with IP addresses, like 192.0.2.44. For an embodiment, this allows users to type domain names into their browsers instead of having to remember and enter IP addresses. The edge routers periodically retrieve the list of the domain names for each maintained application. For example, Microsoft 365 application domain names are published at https://learn.microsoft.com/en-us/microsoft-365/enterprise/urls-and-ip-address-ranges?view=o365-worldwide. Then, the management system distributes the domain names to all edge routers in the network to enable the map maintenance and usage.

For an embodiment, building and maintaining the map between public and private applications, and the destination subnet group comprises the one or more edge router being further configured to retrieve a group of private application domain names from a user defined configuration, and resolve to a group of IP subnets using Domain Name System (DNS), and update the map with the group of IP subnets. For an embodiment, the management system provides a User Interface to allow the end user to configure custom application domain names. The management system distributes this configuration to all edge routers in the network to enable the map maintenance and usage.

For an embodiment, building and maintaining the map between public and private applications, and the destination subnet group comprises the one or more edge router being further configured to retrieve a group of public and private application domain names, and a group of IP subnets from a user defined configuration, resolve the group of public and private application domain names to a group of IP subnets using Domain Name System (DNS), and update the map with the group of IP subnets. For an embodiment, building and maintaining the map between public and private applications, and the destination subnet group includes the one or more edge router being further configured to retrieve a group of public and private application domain names, and a group of IP subnets from a user defined configuration, resolve the group of public and private application domain names to a group of IP subnets using Domain Name System (DNS), and update the map with the group of IP subnets. For an embodiment, the management system provides a User Interface to allow the end user to configure custom application domain names and IP subnets. For an embodiment, the management system distributes this configuration to all edge routers in the network to enable the map maintenance and usage.

For an embodiment, building and maintaining the map between public and private applications, and the destination subnet group includes the one or more edge router being further configured to determine a group of IP subnets for public or private applications from live user sessions processed by the edge routers using Deep Packet Inspection (DPI), and update the map with the group of IP subnets. For an embodiment, the edge routers perform DPI on the live user sessions (network packets routed by the edge router), determine the application used by this session, and update the information in the map with the application name and the destination IP subnet, also extracted from the user session. Deep packet inspection (DPI) is a method of examining the content of data packets as the data packets pass by a checkpoint of the network.

FIG. 8 is a flow chart that includes steps of a method of providing routing guidance to a computing device that is connectable to the edge routers, according to an embodiment. A first step 810 includes estimating, by one or more edge routers, a connection performance from the computing device to a destination subnet group through one or more links between computing device and the one or more edge routers. A second step 820 includes determining, by the one or more edge routers, one or more connection performance scores for the destination subnet group based on the estimated connection performance from the computing device to the destination subnet group through each of the one or more links. A third step 830 includes communicating, by the one or more edge routers, routing guidance to the computing device based on the one or more connection performance scores of each of the one or more links, wherein the routing guidance provides edge router selection information to the computing device.

As previously described, for an embodiment, the routing guidance includes a selected one of the one or more edge routers when more than one edge router is connectable to the computing device. As previously described, for an embodiment, the routing guidance includes the connection performance score for each of the one or more links and wherein the computing device selects one of the one or more links based on the connection performance scores.

As previously described, for an embodiment, estimating the connection performance includes determining, by the one or more edge routers, connection performance metrics between each of the one or more edge routers and the computing device, determining, by the one or more edge routers, connection performance metrics between each of the one or more edge routers and a cloud application, and calculating, by the one or more edge routers, an end-to-end performance using a summary function based on the connection performance metrics between each of the one or more edge routers and computing device, and based on the connection performance metrics between each of the one or more edge routers and the cloud application.

As previously described, for an embodiment, estimating the connection performance includes determining, by the one or more edge routers, connection performance metrics between each of the one or more edge routers and computing device, receiving, by the one or more edge routers, connection performance metrics between a remote edge router and a remote computing device, determining connection performance between the one or more edge routers and the remote edge router, and calculating, by the one or more edge routers, an end-to-end performance using a summary function based on the connection performance metrics between each of the one or more edge routers and computing device, the received connection performance metrics between the remote edge router and the remote computing device, and the connection performance between the one or more edge routers and the remote edge router.

As previously described, for an embodiment, the destination subnet group has any possible IPv4 or IPv6 address, and the network is the default gateway for the computing device, thereby eliminating a need for the end-to-end performance metrics estimation, and connection performance metrics are based only on links between the computing device and the one or more edge routers. For an embodiment, the destination subnet group is any/CIDR 0.0.0.0/0 (any possible/the range of all IPv4 and IPv6 addresses), all routable Internet addresses, all IP addresses in the world, and the network is the default gateway for the computing device IP address (0.0.0.0/0), thereby eliminating a need for the end-to-end performance metrics estimation, and connection performance metrics are based only on links between the computing device and the one or more edge routers.

As previously described, for an embodiment, the destination subnet group is a private application located at a remote site or public application accessible from the Internet, and wherein the communication of the routing guidance to the computing device is done using a private application subnet.

As previously described, for an embodiment, a performance metrics scoring function is different for different applications.

Although specific embodiments have been described and illustrated, the embodiments are not to be limited to the specific forms or arrangements of parts so described and illustrated. The described embodiments are to only be limited by the claims.

What is claimed:

1. A method for providing routing guidance to a computing device, comprising:

estimating, by one or more edge routers, a connection performance from the computing device to a destination subnet group through one or more links between the computing device and the one or more edge routers;

determining, by the one or more edge routers, one or more connection performance scores for the destination subnet group based on the estimated connection performance from the computing device to the destination subnet group through each of the one or more links;

communicating, by the one or more edge routers, routing guidance to the computing device based on the one or more connection performance scores of each of the one or more links, comprising the one or more edge routers building and maintaining a map between public and private applications, and the destination subnet group, and transmitting the routing guidance to the computing device based on the built and maintained map, wherein the routing guidance provides edge router selection information to the computing device; and selecting, by the computing device, at least one link of the one or more links between the computing device and the one or more edge routers based on the routing guidance, wherein the computing device performs a routing selection through the selecting one or more links without having sensing or monitoring of routing performance at the computing device.

2. The method of claim 1, wherein the routing guidance includes a selected one of the one or more edge routers when more than one edge router is connectable to the computing device.

3. The method of claim 1, wherein the routing guidance includes the connection performance score for each of the one or more links and wherein the computing device selects one of the one or more links based on the connection performance scores.

4. The method of claim 1, wherein estimating the connection performance comprises the one or more edge routers being configured to:

determine connection performance metrics between each of the one or more edge routers and the computing device;

determine connection performance metrics between each of the one or more edge routers and a cloud application; and calculate an end-to-end performance using a summary function based on the connection performance metrics between each of the one or more edge routers and computing device, and based on the connection performance metrics between each of the one or more edge routers and the cloud application.

5. The method of claim 1, wherein estimating the connection performance comprises the one or more edge routers being configured to:

determine connection performance metrics between each of the one or more edge routers and computing device;

receive connection performance metrics between a remote edge router and a remote computing device;

determine connection performance between the one or more edge routers and the remote edge router; and calculate an end-to-end performance using a summary function based on the connection performance metrics between each of the one or more edge routers and computing device, the received connection performance metrics between the remote edge router and the remote computing device, and the connection performance between the one or more edge routers and the remote edge router.

6. The method of claim 1, wherein the destination subnet group has any possible IPv4 or IPV6 address, and the network is the default gateway for the computing device, thereby eliminating a need for the end-to-end performance metrics estimation, and connection performance metrics are based only on links between the computing device and the one or more edge routers.

7. The method of claim 1, wherein the destination subnet group is a private application located at a remote site, and wherein the communication of the routing guidance to the computing device is done using a private application subnet.

8. The method of claim 1, wherein a performance metrics scoring function is different for different applications.

9. The method of claim 8, wherein determining the connection performance metrics between each of the one or more edge routers and the cloud application is based on at least network latency, round trip time, network packet loss, network jitter, and network throughput between each of the one or more edge routers and the cloud application.

10. The method of claim 9, wherein determining the connection performance metrics between each of the one or more edge routers and the remote edge router is based on at least Network latency/round trip time, Network packet loss, Network jitter, and Network throughput between each of the one or more edge routers and a cloud application.

11. The method of claim 1, wherein the one or more links include a plurality of links, and further comprising periodically diverting data traffic through an alternate link and monitoring the performance through the plurality of links.

12. The method of claim 11, further comprising updating the routing guidance to the computing device based on the monitoring of the performance through the plurality of links.

13. The method of claim 1, wherein the destination subnet group comprises a private application located at a remote site or public application accessible from the Internet and wherein the communication of the routing guidance to the computing device is done using a private application subnet.

14. The method of claim 1, wherein building and maintaining the map between public and private applications, and the destination subnet group comprises the one or more edge routers being further configured to:

retrieve a group of IP subnets for a public application from the public sources published by an application operator; and update the map with the group of IP subnets.

15. The method of claim 1, wherein building and maintaining the map between public and private applications, and the destination subnet group comprises the one or more edge routers being further configured to:

retrieve a group of internet domain names for a public application from public sources published by an application operator;

resolve to a group of IP subnets using Domain Name System (DNS); and updating the map with the group of IP subnets.

16. The method of claim 1, wherein building and maintaining the map between public and private applications, and the destination subnet group comprises the one or more edge routers being further configured to:

retrieve a group of private application domain names from a user defined configuration;

resolve to a group of IP subnets using Domain Name System (DNS); and update the map with the group of IP subnets.

17. The method of claim 1, wherein building and maintaining the map between public and private applications, and the destination subnet group comprises the one or more edge routers being further configured to:

retrieve a group of public and private application domain names, and a group of IP subnets from a user defined configuration;

resolve the group of public and private application domain names to a group of IP subnets using Domain Name System (DNS); and update the map with the group of IP subnets.

18. The method of claim 1, wherein building and maintaining the map between public and private applications, and the destination subnet group comprises the one or more edge routers being further configured to:

determine a group of IP subnets for public or private applications from live user sessions processed by the edge routers using Deep Packet Inspection (DPI); and update the map with the group of IP subnets.

19. The method of claim 1, wherein the one or more links between the computing device and the one or more edge routers comprises a plurality of links between the computing device and a plurality of edge routers.

* * * * *